US006991200B2

(12) United States Patent
Stillman

(10) Patent No.: US 6,991,200 B2
(45) Date of Patent: *Jan. 31, 2006

(54) HOLDER FOR SUPPORTING A CLEANING UTENSIL

(76) Inventor: Ralph P. Stillman, 19955 Cottagewood Ave., Deephaven, MN (US) 55331

( * ) Notice: Subject to any disclaimer, the term of this patent is extended or adjusted under 35 U.S.C. 154(b) by 0 days.

This patent is subject to a terminal disclaimer.

(21) Appl. No.: 10/629,493

(22) Filed: Jul. 29, 2003

(65) Prior Publication Data

US 2004/0021045 A1    Feb. 5, 2004

Related U.S. Application Data

(63) Continuation of application No. 09/814,352, filed on Mar. 21, 2001, now Pat. No. 6,619,604.

(51) Int. Cl.
A45D 42/14    (2006.01)

(52) U.S. Cl. ............... 248/205.5; 248/37; 248/309.3; 206/361; 206/362.2; 206/77.1; D6/536; 401/131; 15/257.01

(58) Field of Classification Search ............ 248/205.5, 248/205.3, 37, 206.3, 309.3, 94, 362, 363; 401/131, 196; 15/257.01; 206/361, 362.2, 206/77.1; 211/119.009, 89.01; 220/476, 220/483; 4/628; D6/536, 540
See application file for complete search history.

(56) References Cited

U.S. PATENT DOCUMENTS

| | | | |
|---|---|---|---|
| 1,221,587 A * | 4/1917 | Pratt | 401/198 |
| 1,309,965 A * | 7/1919 | Schab | 248/231.81 |
| 1,479,361 A * | 1/1924 | Blevens | 312/351 |
| 1,905,069 A * | 4/1933 | Stair | 248/206.3 |
| 2,202,242 A | 5/1940 | Wortham | |
| 2,456,174 A | 12/1948 | Clark | |
| 2,524,371 A * | 10/1950 | Betron et al. | 228/19 |
| 2,712,709 A | 7/1955 | Pulrang | |
| 2,767,019 A * | 10/1956 | Manville | 239/416.2 |
| 3,185,537 A | 5/1965 | Wright | |
| 3,328,830 A * | 7/1967 | Corwin | 401/6 |
| 4,309,014 A | 1/1982 | Blaszkowski | |
| 4,696,447 A | 9/1987 | Strecker | |
| 4,779,829 A | 10/1988 | Rocke et al. | |
| 4,993,546 A * | 2/1991 | Southard | 206/77.1 |
| 5,038,955 A * | 8/1991 | Studer et al. | 220/736 |
| 5,039,046 A | 8/1991 | Brewster | |
| D322,554 S | 12/1991 | Amussen | |
| 5,114,106 A | 5/1992 | Daugherty et al. | |
| D333,583 S | 3/1993 | Hurd | |
| 5,242,064 A * | 9/1993 | Martell | 211/85.13 |
| 5,322,382 A * | 6/1994 | Hull et al. | 401/131 |
| 5,340,070 A | 8/1994 | Soma | |
| D369,049 S | 4/1996 | Scaglione | |
| D370,375 S | 6/1996 | Murgida et al. | |
| D371,735 S | 7/1996 | Motta | |
| 5,657,954 A | 8/1997 | Emery et al. | |
| 5,680,929 A * | 10/1997 | Von Seidel | 206/77.1 |

(Continued)

*Primary Examiner*—Kimberly T. Wood
(74) *Attorney, Agent, or Firm*—Merchant & Gould P.C.

(57) ABSTRACT

A holder for supporting a cleaning utensil is disclosed. The holder includes a support platform that is sized and configured to receive and support at least a portion of the cleaning utensil. The holder also includes a drainage conductor that is situated and arranged proximate a front edge of the support platform. A retaining arrangement is provided integral with the support platform. The retaining arrangement is configured to constrain the cleaning utensil within the holder, such that fluid can be readily drained from the holder.

20 Claims, 5 Drawing Sheets

U.S. PATENT DOCUMENTS

| | | |
|---|---|---|
| 5,947,432 A | 9/1999 | Reddin et al. |
| 6,035,859 A * | 3/2000 | Antonopoulos-McIvor ............ 132/74.5 |
| 6,113,048 A | 9/2000 | Shire |
| D434,525 S * | 11/2000 | Angeletta ............ D28/7 |
| 6,142,432 A | 11/2000 | Amussen |
| 6,152,294 A | 11/2000 | Weinberg |
| 6,619,604 B1 * | 9/2003 | Stillman ............ 248/205.5 |

* cited by examiner

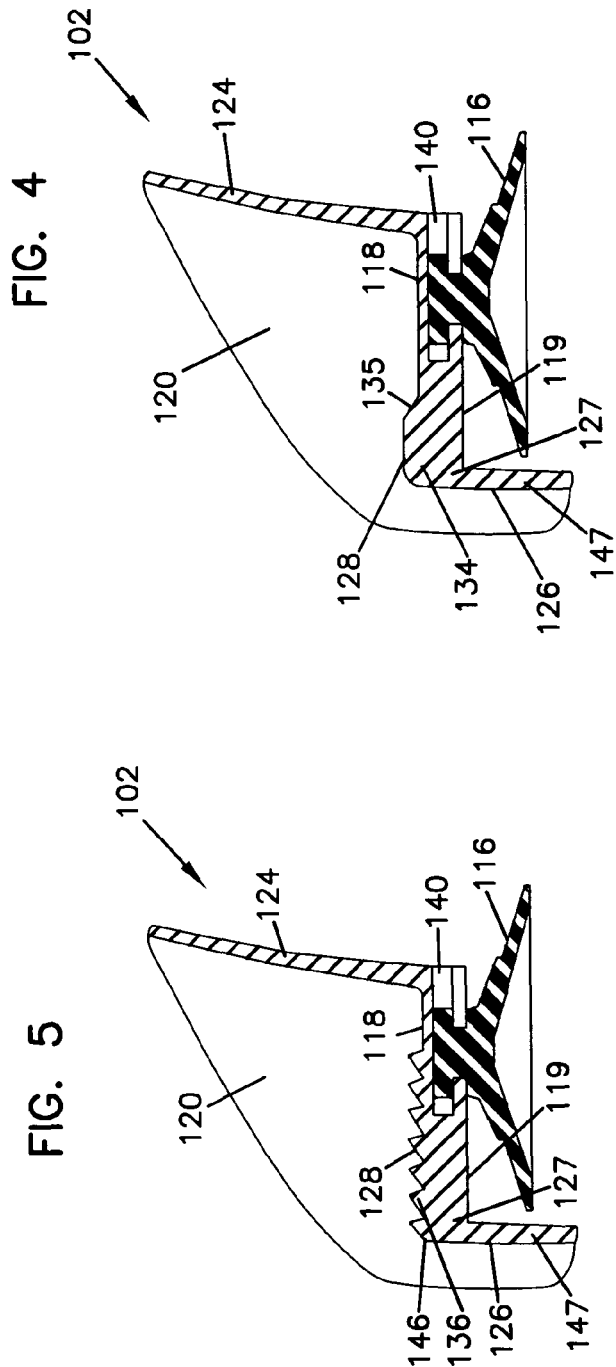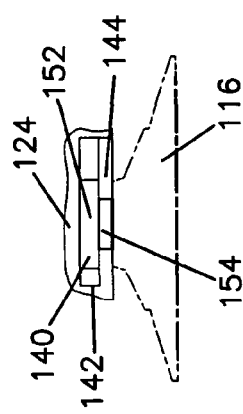

HOLDER FOR SUPPORTING A CLEANING UTENSIL

This application is a continuation of application Ser. No. 09/814,352, filed Mar. 21, 2001, now U.S. Pat. No. 6,619,604 B1, which application is incorporated herein by reference.

TECHNICAL FIELD

The present invention relates generally to a holder for supporting a cleaning utensil and, more particularly, to a holder for supporting a cleaning utensil such that fluid can be readily drained from the holder.

BACKGROUND

The use of hand-held cleaning utensils has increased significantly in recent years. Typically, hand-held cleaning utensils can be used for cleaning and/or scrubbing various articles, such as, dishware or tableware, tools, or other articles that can easily be cleaned using a hand-held cleaning utensil. Existing hand-held cleaning utensils include a cleaning head or attachment that contacts the article being cleaned. Additionally, many existing hand-held cleaning utensils also include a reservoir for providing a cleaning solution to the head during use. As a user cleans an article, the cleaning solution can be dispensed through the cleaning head to assist in cleaning. Moreover, most cleaning utensils are relatively easy to handle. Accordingly, such hand-held cleaning utensils provide an easy and efficient means to clean and/or scrub a variety of articles.

Despite the effectiveness of such hand-held cleaning utensils, several shortcomings exist that limit their overall usefulness. For example, because of the shape of many existing cleaning utensils, they are often awkward to store when not in use. In particular, many existing hand-held cleaning utensils are placed on their side when not in use. As a result, cleaning solution from the reservoir can continue to flow through the cleaning attachment when the cleaning utensil is not in use. Similarly, excess fluid can continue to discharge from the cleaning attachment as it dries. As a result, undesirable residue often builds up or collects at the storage location.

Improvements in holders for supporting hand-held cleaning utensils are, therefore, sought.

SUMMARY

In general terms, the present disclosure relates to a holder for supporting a cleaning utensil. More particularly, the present disclosure relates to a holder for supporting a cleaning utensil such that fluid can be readily drained from the holder. In one aspect, the holder includes a support platform that is sized and configured to receive and support at least a portion of the cleaning utensil. The holder also includes a drainage conductor that is situated and arranged proximate a front edge of the support platform. A retaining arrangement is provided integral with the support platform. The retaining arrangement is preferably configured to constrain the cleaning utensil within the holder.

In this aspect, the drainage conductor can include first and second flange members along a periphery of the drainage conductor. The drainage conduction can also include a plate member depending downwardly from the support platform. Furthermore, the support platform can define at least one drainage channel configured to allow fluid to drain from the holder.

Still further in this aspect, the holder can include first and second sidewalls extending upwardly from the support platform. Additionally, the holder can include a back wall between the first and second sidewalls that also extends upwardly from the support platform. The support platform can define a first drainage channel disposed between the retaining arrangement and the first sidewall. Similarly, the support platform can define a second drainage channel disposed between the retaining arrangement and the second sidewall. Each of the first and second drainage channels can be configured to allow fluid to drain from the holder.

Still yet in this aspect, the retaining member can include a ridge member integral with the support platform proximate the front edge of the support platform. Alternatively, the retaining member can include one or more grooves defined in the support platform.

Further in this aspect, the holder can include an attachment device for securing the holder to an external surface. For example, the attachment device can include a suction cup. The attachment device can be removably secured at the support platform of the holder.

In another aspect, the disclosure relates to a holder for supporting a dishwashing utensil. In this aspect, the holder includes a support platform that is sized and configured to receive and support at least a portion of the dishwashing utensil. The holder also includes first and second sidewalls that extend upwardly from the support platform. Additionally, the holder includes a back wall between the first and second sidewalls. The back wall also extends upwardly from the support platform. Moreover, in this aspect, the support platform defines at least one drainage channel that is configured to allow fluid to drain from the holder. The holder also includes a drainage conductor that is situated and arranged proximate a front edge of the support platform. A retaining arrangement is also provided integral with the support platform. The retaining arrangement is configured to constrain the dishwashing utensil within the holder.

Further in this aspect, the drainage conductor can include first and second flange members along a periphery of the drainage conductor. The drainage conduction can also comprise a plate member depending downwardly from the support platform. Furthermore, the support platform can define at least one drainage channel configured to allow fluid to drain from the holder.

As mentioned above, the support platform defines at least one drainage channel that is configured to allow fluid to drain from the holder in one embodiment. Further in this aspect, the support platform can define a first drainage channel disposed between the retaining arrangement and the first sidewall. Similarly, the support platform can define a second drainage channel disposed between the retaining arrangement and the second sidewall. Each of the first and second drainage channels can be configured to allow fluid to drain from the holder.

Still further in this aspect, the retaining member can comprise a ridge member integral with the support platform proximate the front edge of the support platform. Alternatively, the retaining member can comprise one or more grooves defined in the support platform.

Further in this aspect, the holder can comprise an attachment device for securing the holder to an external surface. For example, the attachment device can include a suction cup. The attachment device can be removably secured at the support platform of the holder.

BRIEF DESCRIPTION OF THE DRAWINGS

The invention may be more completely understood in consideration of the following detailed description of various embodiments of the invention in connection with the accompanying drawings, in which:

FIG. 4 is a cross-sectional view of the holder of FIG. 3 taken along lines 4—4;

FIG. 5 is a cross-sectional view of an alternative embodiment of a holder in accordance with the principles of the present disclosure;

FIG. 6 is a sectional view of a rear of the holder of FIG. 1; and

Figure 1:
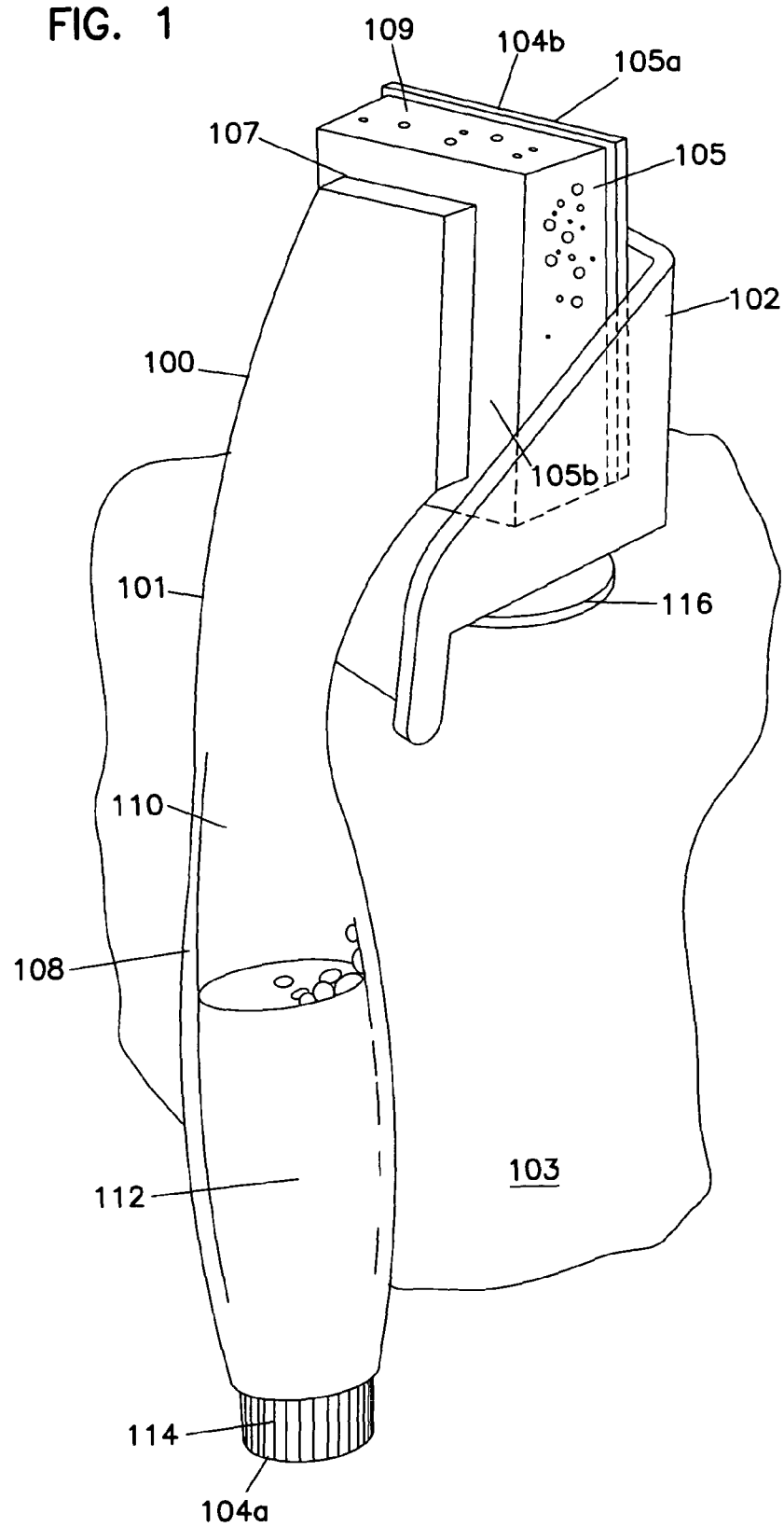
FIG. 1 is a perspective view of a cleaning utensil being supported by a holder in accordance with the principles of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Various embodiments of the present invention will be described in detail with reference to the drawings, wherein like reference numerals represent like parts and assemblies throughout the several views. Reference to various embodiments does not limit the scope of the present invention, which is limited only by the scope of the claims attached hereto.

The following discussion is intended to provide a brief, general description of a suitable holder for supporting a hand-held cleaning utensil. As will become apparent from the discussion below in connection with the accompanying drawings, the present disclosure has particularized applicability to holders for supporting hand-held cleaning utensils used to clean articles used in preparing and/or serving food, such as, dishware or tableware, including china, glassware, flatware, pots, pans, or other similar articles. However, it will be appreciated by those having skill in the art that the present disclosure is not limited to the specific embodiments discussed below. Rather, the holder of the present disclosure may be used to support various other hand-held utensils.

Now referring to FIG. 1, a holder 102 for supporting a hand-held cleaning utensil 100 in accordance with the principals of the present disclosure is shown. As shown in FIG. 1, the holder 102 can support the cleaning utensil 100 adjacent to an external surface, such as, a storage structure or disposal mechanism 103. In the illustrated embodiment, the storage structure or disposal mechanism 103 is a typical household sink, such as, a stainless steel or porcelain sink. However, it will be appreciated by those having ordinary skill in the art that the holder 102 can support the cleaning utensil 100 adjacent to any suitable structure, such as a tub, basin, bucket, wall, or other storage structure or disposal mechanism that is capable of supporting the cleaning utensil 100 and allowing excess fluid to be drained as will be discussed in greater detail below.

In the embodiment illustrated in FIG. 1, the cleaning utensil 100 generally includes a main body 101 having a proximal end 104a and a distal end 104b. The phrase "proximal end" is generally meant to refer to the portion of the cleaning utensil 100 that is held in the user's hand during use. Conversely, the phrase "distal end" is generally meant to refer to the portion of the cleaning utensil 100 at or near a location that contacts the article being cleaned. The main body 101 can include a handle portion 108 at or near its proximal end 104a and a head portion 105 at or near its distal end 104b. In the illustrated embodiment, the handle portion 108 depends downwardly along the main body 101 away from the head portion 105 to provide a suitable area for gripping or handling the cleaning utensil 100 during use. By "downwardly," it is generally meant that in the orientation shown in FIG. 1, the handle portion 108 extends below the head portion 105. Furthermore, the head portion 105 extends away from and transverse to the main body 101 and rests within the holder 102 when the cleaning utensil 100 is not in use.

Additionally, the main body 101 of the cleaning utensil 100 can define a reservoir 110 that can be used to store a solution 112. In one possible embodiment, the reservoir 110 can be used to store a cleaning solution, such as, a liquid detergent or disinfectant. During use, the solution 112 within the reservoir 110 can flow and dispense through the head portion 105. In particular, when the cleaning utensil 100 is held downwardly (e.g., in an orientation opposite that shown in FIG. 1), gravity causes the solution 112 to flow and dispense through the head portion 105, thereby, facilitating cleaning of the article being cleaned. Moreover, as shown in FIG. 1, the reservoir 110 can include a removable cap 114 located at the proximal end 104a. Accordingly, the reservoir 110 can be refilled as the solution 112 is depleted.

The head portion 105 preferably includes structure for cleaning and/or scrubbing the article being cleaned. While many structures for cleaning and/or scrubbing the article being cleaned are contemplated, in the illustrated embodiment, the head 105 generally includes, for example, a sponge member 109. However, one having ordinary skill in the art will readily appreciate that the head 105 can include various structures or devices that can be used to clean and/or scrub the article being cleaned, for example, a collection of bristles (e.g., a brush), a scouring pad, a polishing pad, or any other suitable structure for cleaning and/or scrubbing the article being cleaned. As shown, the head portion 105 includes a cleaning surface 105a and an attachment surface 105b opposite the cleaning surface 105a. During use, the cleaning surface 105a contacts the article being cleaned. The main body 101 of the cleaning utensil 100 is secured to the attachment surface 105b. Moreover, at least a portion of the attachment surface 105 can define a permeable head/body interface 107. Thus, as described above, the solution 112 within the reservoir 110 can flow and dispense through the head portion 105.

Figure 2:
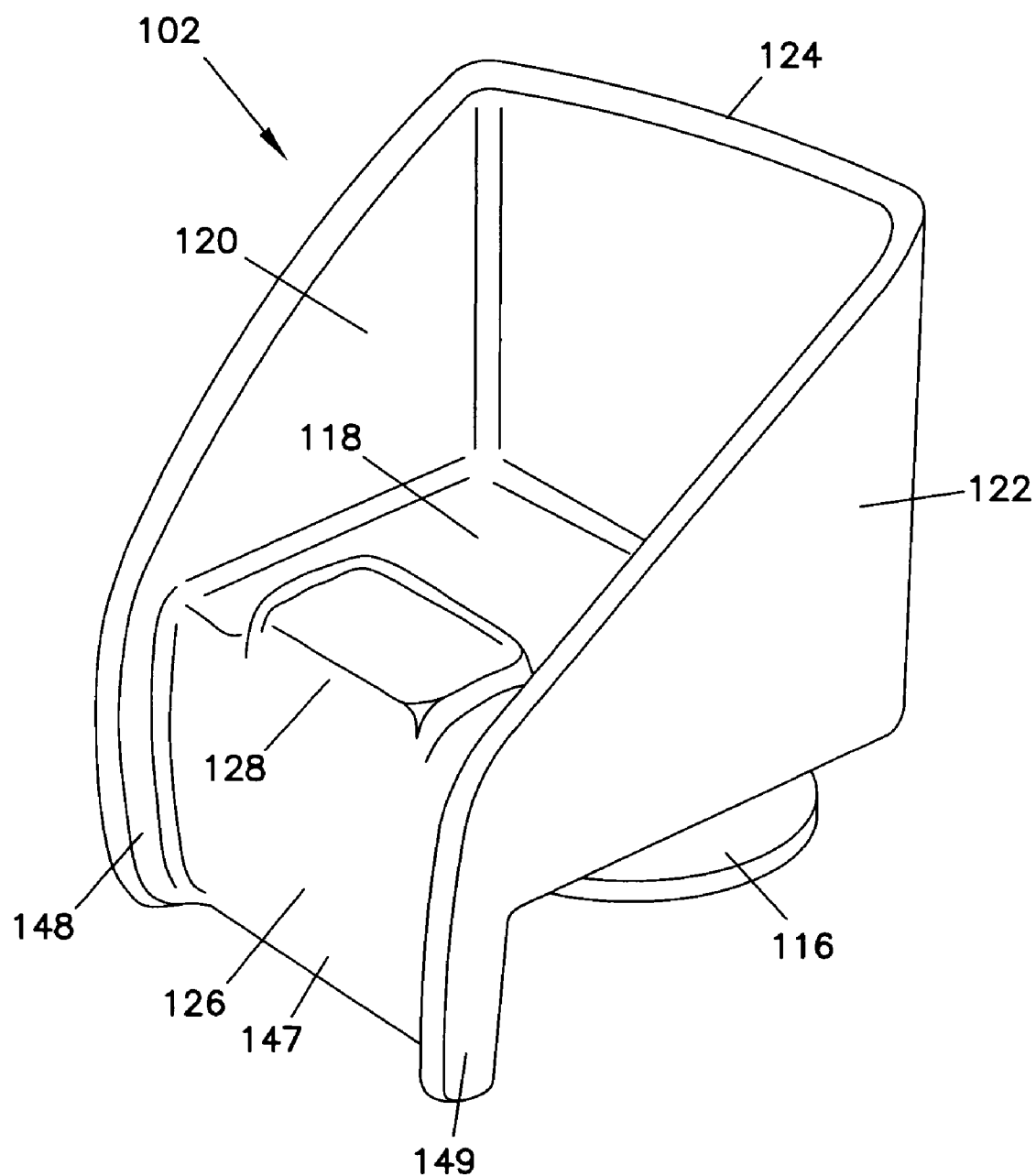
FIG. 2 is a perspective view of the holder of FIG. 1.
Figure 3:
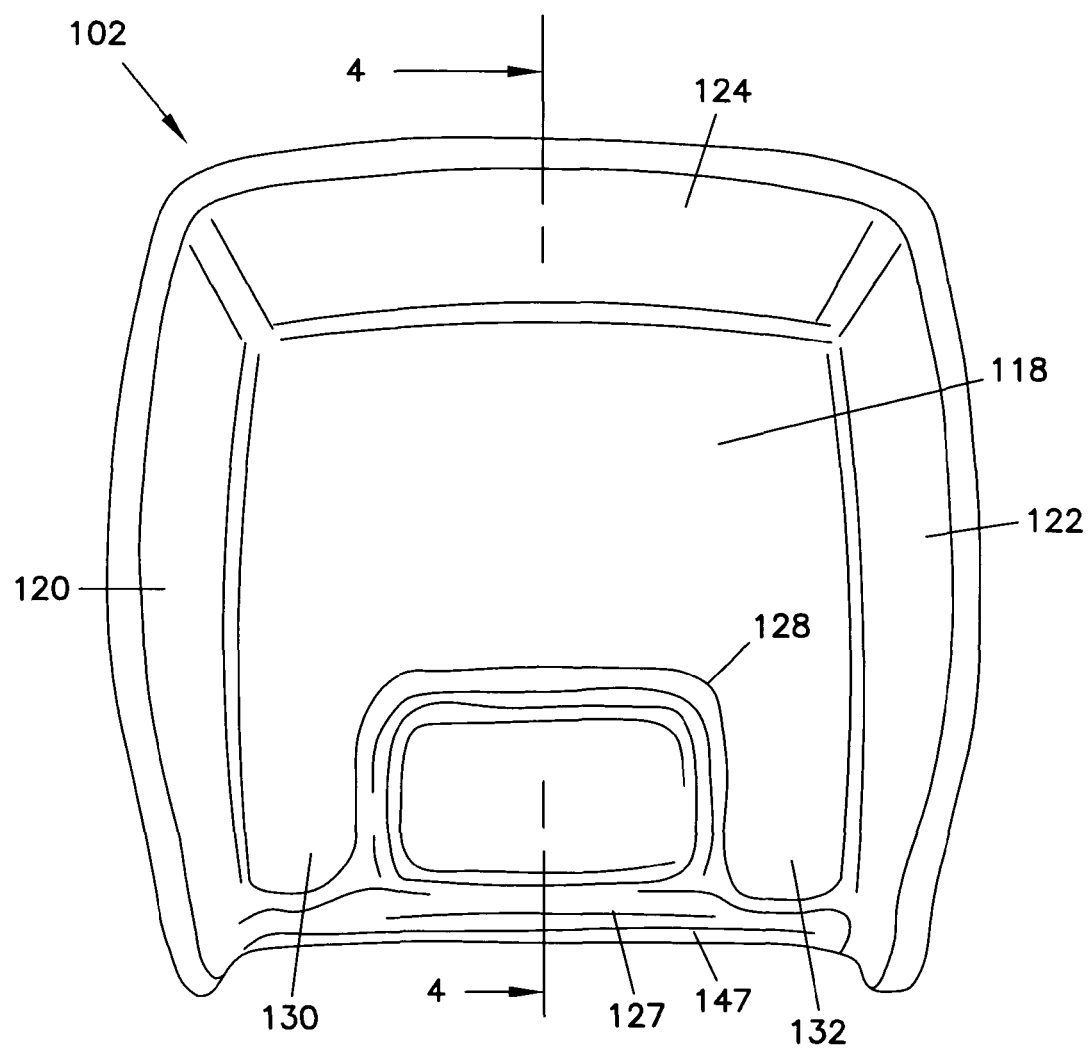
FIG. 3 is a top view of the holder of FIG. 1.

FIGS. 2 and 3 illustrate a perspective view and a top view, respectively, of the holder 102 in accordance with the principles of the present disclosure. In one possible embodiment, the holder 102 can be manufactured from a polymeric material, such as, a thermoplastic or thermosetting plastic. In this embodiment, the holder 102 can be manufactured using any suitable molding process, such as, compression molding, transfer molding, or injection molding. In alternative embodiments, the holder 102 can be manufactured from a ceramic material, a metallic material, such as a stainless steel, or any other suitable material. The use of a ceramic material to construct the holder 102 may increase a decorative function of the holder.

As shown in FIG. 2, the holder 102 generally comprises a support platform 118 that is sized and configured to receive the hand-held cleaning utensil 100 (FIG. 1). In particular, the support platform 118 is sized and configured to support at least a portion of the head 105 (FIG. 1) described above. In one possible embodiment, the holder 102 can define a partially enclosed structure for receiving the hand-held cleaning utensil 100. For example, in the embodiment illustrated, the holder 102 includes a first sidewall 120 and a second sidewall 122 opposite the first sidewall 120. The first and second sidewalls, 120, 122, generally extend upwardly from the support platform 118. By "upwardly," it is generally meant that in the orientation shown in FIG. 2, the first and second sidewalls 120, 122 extend above the support platform 118. Additionally, the holder 102 illustrated in FIG. 2 also includes a back wall 124 between the first and second sidewalls 120, 122. The back wall 124 also extends upwardly from the support platform 118.

Additionally, the holder 102 also includes a structure for constraining the cleaning utensil 100 (FIG. 1) when it is received within the holder 102. In particular, as shown in FIG. 2, the holder 102 includes a retaining arrangement 128 that is configured to constrain the cleaning utensil 100 within the holder 102 when not in use. By "constrain," it is generally meant that the retaining arrangement 128 restricts or limits the motion of the cleaning utensil 100 when received within the holder 102. In particular, the retaining arrangement 128 constrains the cleaning utensil 100 to prevent it from inadvertently sliding out of the holder 102 (e.g., away from the back wall 124). In one possible embodiment, the retaining arrangement 128 is integral with the support platform 118. A more detailed illustration of the retaining arrangement 128 is shown in FIG. 4 which is a cross-sectional view taken along line 4—4 of FIG. 3. The retaining arrangement illustrated in FIG. 4 generally includes a ridge member 134 that is integral with the support platform 118. In this embodiment, the ridge member 134 can be situated and arranged at or near a front edge 127 (e.g., opposite the back wall 124) of the support platform 118. In this embodiment, the ridge member 134 includes an engaging face 138 that contacts or abuts a lower portion of the attachment surface 105b (FIG. 1) of the head 105 (FIG. 1) when the cleaning utensil 100 (FIG. 1) is placed within the holder 102.

In an alternative embodiment, however, the retaining arrangement 128 can include any texture or surface roughness/depressions disposed at the support platform 118 that is capable of constraining the cleaning utensil 100 when it is received within the holder 102. For example, as shown in FIG. 5, the retaining arrangement 128 can include one or more groove members 136 that resistively contact the head 105 when placed within the holder 102, thereby, restricting or limiting the movement of the cleaning utensil 100 when placed within the holder 102.

In a further alternative embodiment, two ridge members are provided near the front edge of the support platform with a drainage channel defined between the ridge members. This embodiment is not illustrated. Each ridge member extends from a side of the support platform toward the center.

Generally, as mentioned above, the holder 102 is sized and configured to the head portion 105 of the cleaning utensil 100. In some embodiments, the holder 102 has an overall width from the first sidewall 120 to the second sidewall 122 of at least about 0.5 inches (about 1.3 cm), no greater than about 8 inches (about 20 cm), typically about 1.0–5.0 inches (about 2.5–13 cm), and in a preferred embodiment about 1.5–3.0 inches (about 4–8 cm). Similarly, the holder 102 has an overall depth from the front edge 127 to the back wall 124 of at least about 0.5 inches (about 1.3 cm), no greater than about 5 inches (about 13 cm), typically about 1.0–3.0 inches (about 2.5–8 cm), and in a preferred embodiment about 1.2–2.0 inches (about 3–5 cm).

The holder 102 provides a convenient and useful location for storing a hand-held cleaning utensil 100 when not is use. As discussed above, when the cleaning utensil 100 is stored after use, excess fluid can discharge from the head 105, thereby causing undesirable residue (e.g., soap/detergent solutions, etc.) to build-up or collect. The holder 102 of the present disclosure minimizes the amount of build-up caused by excess fluid being discharged from the head 105. In particular, as shown in FIG. 3, the support platform 118 can include structure for allowing excess fluid to be drained from the holder 102. For example, the support platform 118 can define at least one drainage channel that is configured to allow fluid to drain from the holder 102. In the embodiment illustrated in FIG. 3, the support platform 118 defines a first drainage channel 130 and a second drainage channel 132 that are each configured to allow fluid to drain from the holder 102. The first drain channel 130 can be disposed between the retaining arrangement 128 and the first sidewall 120. Similarly, the second drainage channel 132 can be disposed between the retaining arrangement 128 and the second sidewall 122. The first and second drainage channels 130, 132 provide a path for fluid to drain from the holder 102. The width of each of the drainage channels 130, 132 is generally sufficient to allow excess fluid to drain from the holder 102. In one possible embodiment, the width of each of the drainage channels 130, 132 is no more than 50% of the length of the retaining arrangement 128, typically about 10–40% of the overall width of the retaining arrangement 128, and is preferably about 25% of the overall width of the retaining arrangement 128 as shown in FIG. 3.

Additionally, the holder 102 also can include a drainage conductor 126 that encourages fluid to drain from the holder 102. Generally, the drainage conductor 126 can include any structure capable of directing the fluid being drained from the holder 102 downwards and away from the support platform 118. As a result, the drainage conductor 126 can minimize the likelihood that the fluid being drained from the holder 102 will flow underneath the holder 102. In one possible embodiment, the drainage conductor 126 can comprise a rounded, leading edge 146 at or near the front edge 127 of the support platform 118. In an alternative embodiment, the drainage conductor 126 can include or further include a drainage plate 147 that extends downwardly below the support platform 118. By "downwardly," it is generally meant that in the orientation shown in FIG. 2, the drainage plate 147 extends below at least a bottom surface 119 (FIG. 5) of the support platform 118. Furthermore, as shown in FIG. 2, the drainage conductor 126 can include a first flange member 148 and a second flange member 149 situated along a periphery of the drainage conductor 126. In so doing, the drainage conductor 126 facilitates the flow of fluid from the holder 102 downwards and away from the support platform 118.

Figure 7:
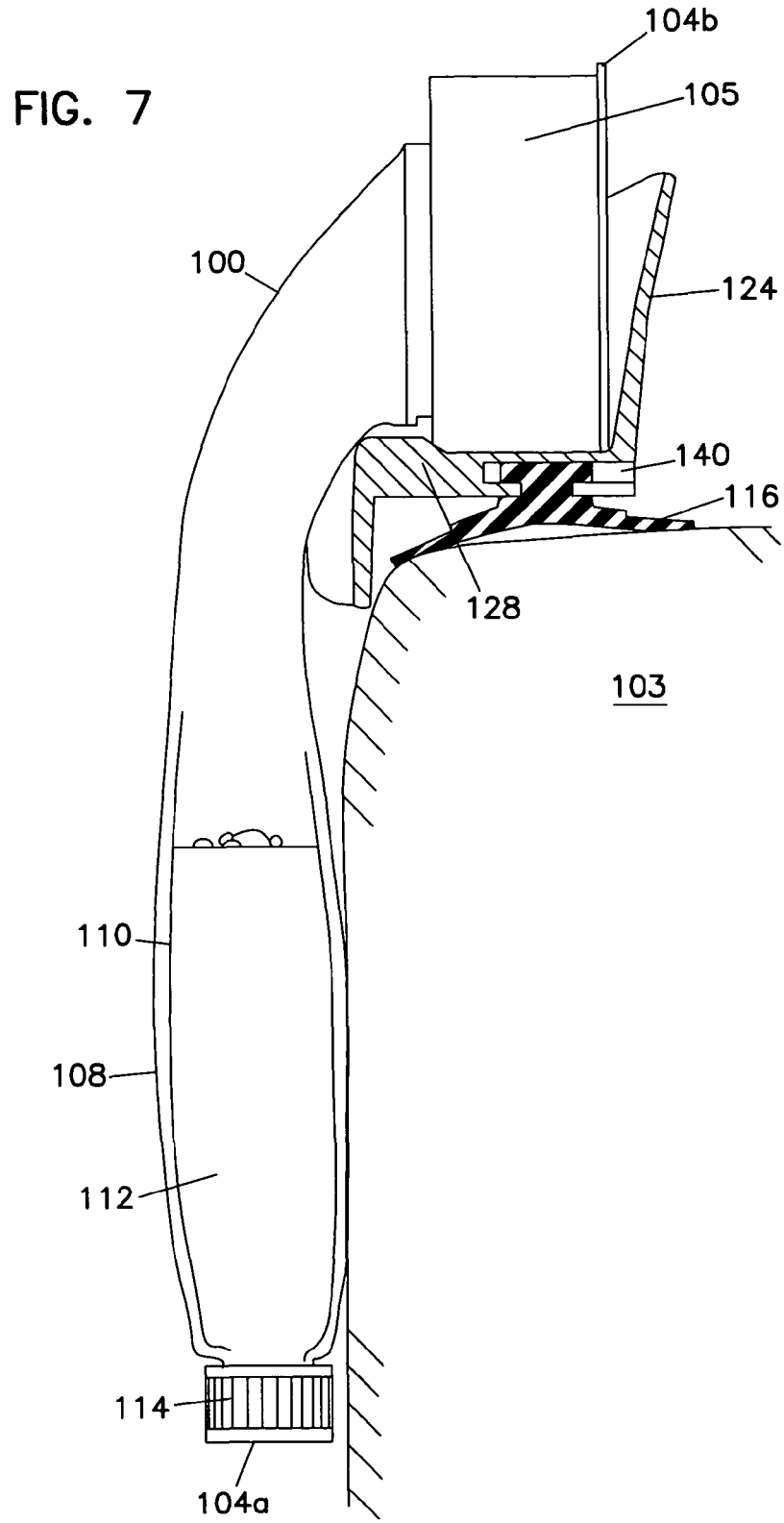
FIG. 7 is a side elevational view of a cleaning utensil being supported by a holder, where a cross-section of the holder is shown, in accordance with the principles of the present disclosure.

As shown in FIG. 7, the holder 102 can be secured to a storage structure or disposal mechanism 103, such as, a conventional household sink, using an attachment device 116. While many embodiments of the attachment device 116 are contemplated, the attachment device 116 shown in FIG. 7 generally can include any device capable of securing the holder 102 to the storage structure 103. In one possible embodiment, the attachment device 116 includes a device that can removably secure the holder 102 to the storage structure 103, such as, a hook and loop fastener, one or more snap fasteners, or other fastening devices. One skilled in the art will readily appreciate that the attachment device 116 can include any suitable device capable of rigidly securing the holder 102 to the storage structure 103, such as, one or more screws, bolts, rivets, or other similar fasteners.

In the embodiment illustrated in FIG. 7, the attachment device 116 includes a suction cup secured at the bottom surface 119 of the support platform 118. As shown in FIG. 6, the suction cup 116 can include a tongue portion 152 and a neck portion 154. A guide channel 140 can be provided at the bottom surface 119 of the support platform 118 for receiving the suction cup 116. In particular, the guide channel 140 includes an upper guide 142 and a lower guide 144. The upper guide 142 defines a first opening for receiving the tongue portion 152 of the suction cup 116. Similarly, the lower guide 144 defines a second opening for receiving the neck portion 154. The suction cup 116 can be installed by slidably engaging the tongue and neck portions 152, 154 with the guide channel 140. In one possible embodiment, the suction cup 116 is slid into engagement with holder 102 from the rear (e.g., from the back wall 124 towards the front edge 127). Once installed, the lower guide 144, which is narrower than the upper guide 142, traps the tongue portion 152 within the guide channel 140, thereby, securing the suction cup 116 to the holder 102.

The above specification, examples and data provide a complete description of the manufacture and use of the composition of the invention. Since many embodiments of the invention can be made without departing from the spirit and scope of the invention, the invention resides in the claims hereinafter appended.

The claimed invention is:

1. A system comprising:
(a) a cleaning utensil including a head portion and main body portion, where the main body portion defines a reservoir for cleaning solution and the head portion is configured to dispense the cleaning solution; and
(b) a holder for supporting the cleaning utensil comprising:
(i) a support platform sized and configured to receive and support the head portion of the cleaning utensil, wherein the support platform includes a back wall extending upward from the back edge of the support platform,
(ii) a retaining arrangement integral with the support platform, the retaining arrangement being configured to constrain the head of the cleaning utensil within the holder so that the reservoir of the cleaning utensil is situated downwardly from the head portion, wherein the retaining arrangement comprises a continuous ridge parallel with and along at least a portion of the front edge of the support platform, wherein the ridge includes a substantially flat surface for engaging a portion of a cleaning utensil, wherein the ridge extends along about half or more of a distance of the front edge of the support platform; and
(c) a drainage conductor arranged proximate a front edge of the support platform, wherein the drainage conductor includes first and second flange members along a periphery on the drainage conductor.

2. The system according to claim 1, further comprising a first and a second sidewall extending upwardly from the support platform.

3. The system according to claim 2, wherein the support platform defines:
(a) a first drainage channel disposed between the retaining arrangement and the first sidewall; and
(b) a second drainage channel disposed between the retaining arrangement and the second sidewall;
(i) the first and second drainage channels being configured to allow fluid to drain from the holder.

4. The system according to claim 1, wherein the retaining arrangement comprises a ridge member integral with the support platform proximate the front edge of the support platform.

5. The system according to claim 1, further comprising an attachment device for removably fixing the holder to a surface, wherein the attachment device includes a suction cup.

6. A system comprising:
(a) a cleaning utensil including a head portion and main body portion, where the main body portion defines a reservoir for cleaning solution and the head portion is configured to dispense the cleaning solution; and
(b) a holder for supporting the cleaning utensil comprising:
(i) a support platform sized and configured to receive and support the head portion of the cleaning utensil, wherein the support platform includes a back wall extending upward from the back edge of the support platform,
(ii) a retaining arrangement integral with the support platform, the retaining arrangement being configured to constrain the head of the cleaning utensil within the holder so that the reservoir of the cleaning utensil is situated downwardly from the head portion, wherein the retaining arrangement comprises one or more grooves defined in the support platform.

7. A holder for supporting a dishwashing utensil adjacent a sink, the holder comprising:
(a) a support platform sized and configured to receive a portion of the dishwashing utensil;
(b) a drainage conductor situated and arranged proximate a front edge of the support platform wherein the drainage conductor comprises an open plate member depending downward from the support platform,
(c) a retaining arrangement integral with the support platform; the retaining arrangement being configured to constrain a portion of the dishwashing utensil within the holder, wherein the retaining arrangement comprises a continuous ridge parallel with and along at least a portion of the front edge of the support platform, wherein the ridge includes a substantially flat surface for engaging a portion of a cleaning utensil, wherein the ridge extends along about half or more of a distance of the front edge of the support platform.

8. The holder according to claim 7, wherein the drainage conductor includes first and second flange members along a periphery on the drainage conductor.

9. The holder according to claim 7, further comprising a first and second sidewall extending upwardly from the support platform.

10. The holder according to claim 9, wherein the support platform defines:
(a) a first drainage channel disposed between the retaining arrangement and the first sidewall; and (b) a second drainage channel disposed between the retaining arrangement and the second sidewall;
  (i) the first and second drainage channels being configured to allow fluid to drain from the holder.

11. The holder according to claim 7, further comprising an attachment device for removably fixing the holder to a surface, wherein the holder can be attached and detached without any tools.

12. The holder according to claim 11, wherein the attachment device includes a suction cup.

13. The holder according to claim 7, wherein the holder is manufactured from a polymeric material.

14. A system comprising:
(a) a cleaning utensil including a head portion and main body portion, where the main body portion defines a reservoir for cleaning solution and the head portion is configured to dispense the cleaning solution; and
(b) a holder for supporting the cleaning utensil comprising:
  (i) a support platform sized and configured to receive and support the head portion of the cleaning utensil;
  (ii) a first and second sidewall extending upwardly from the support platform;
  (iii) a retaining arrangement integral with the support platform, the retaining arrangement being configured to constrain the head of the cleaning utensil within the holder so that the reservoir of the cleaning utensil is situated downwardly from the head portion, wherein the retaining arrangement comprises a continuous ridge parallel with and along at least a portion of the front edge of the support platform, wherein the ridge includes a substantially flat surface for engaging a portion of a cleaning utensil, wherein the ridge extends along about half or more of a distance of the front edge of the support platform.

15. The system according to claim 14, further comprising a drainage conductor arranged proximate a front edge of the support platform, wherein the drainage conductor includes first and second flange members along a periphery on the drainage conductor.

16. The system according to claim 14, wherein the support platform defines:
(a) a first drainage channel disposed between the retaining arrangement and the first sidewall; and
(b) a second drainage channel disposed between the retaining arrangement and the second sidewall;
  (i) the first and second drainage channels being configured to allow fluid to drain from the holder.

17. The system according to claim 14, further comprising an attachment device for removably fixing the holder to a surface, wherein the attachment device includes a suction cup.

18. A system comprising:
(a) a cleaning utensil including a head portion and main body portion, where the main body portion defines a reservoir for cleaning solution and the head portion is configured to dispense the cleaning solution;
(b) a holder for supporting the cleaning utensil comprising:
  (i) a support platform sized and configured to receive and support the head portion of the cleaning utensil,
  (ii) a retaining arrangement integral with the support platform, the retaining arrangement being configured to constrain the head of the cleaning utensil within the holder so that the reservoir of the cleaning utensil is situated downwardly from the head portion, wherein the retaining arrangement comprises a continuous ridge parallel with and along at least a portion of the front edge of the support platform, wherein the ridge includes a substantially flat surface for engaging a portion of a cleaning utensil, wherein the ridge extends along about half or more of a distance of the front edge of the support platform;
  (iii) a drainage conductor arranged proximate a front edge of the support platform, wherein the drainage conductor includes first and second flange members along a periphery on the drainage conductor; and
(c) an attachment device for removably fixing the holder to a surface, wherein the attachment device includes a suction cup.

19. The system according to claim 18 further comprising a first and second sidewall extending upwardly from the support platform, wherein the support platform defines:
(a) a first drainage channel disposed between the retaining arrangement and the first sidewall; and
(b) a second drainage channel disposed between the retaining arrangement and the second sidewall;
  (i) the first and second drainage channels being configured to allow fluid to drain from the holder.

20. A system comprising:
(a) a cleaning utensil including a head portion and main body portion, where the main body portion defines a reservoir for cleaning solution and the head portion is configured to dispense the cleaning solution;
(b) a holder for supporting the cleaning utensil comprising:
  (i) a support platform sized and configured to receive and support the head portion of the cleaning utensil,
  (ii) a retaining arrangement integral with the support platform, the retaining arrangement being configured to constrain the head of the cleaning utensil within the holder so that the reservoir of the cleaning utensil is situated downwardly from the head portion, wherein the retaining arrangement comprises one or more grooves defined in the support platform; and
(c) an attachment device for removably fixing the holder to a surface, wherein the attachment device includes a suction cup.

* * * * *